(12) United States Patent
Zhang et al.

(10) Patent No.: US 11,464,228 B2
(45) Date of Patent: Oct. 11, 2022

(54) APPLICATION OF ACETYLACETONE IN INHIBITING GROWTH OF CYANOBACTERIA

(71) Applicant: NANJING UNIVERSITY, Nanjing (CN)

(72) Inventors: Shujuan Zhang, Nanjing (CN); Jiyuan Jin, Nanjing (CN); Xiaomeng Wang, Nanjing (CN); Xin Wang, Nanjing (CN); Wentao Zhang, Nanjing (CN)

(73) Assignee: Nanjing University, Nanjing (CN)

( * ) Notice: Subject to any disclaimer, the term of this patent is extended or adjusted under 35 U.S.C. 154(b) by 0 days.

(21) Appl. No.: 17/290,982

(22) PCT Filed: Aug. 26, 2020

(86) PCT No.: PCT/CN2020/111195
§ 371 (c)(1),
(2) Date: May 3, 2021

(87) PCT Pub. No.: WO2021/139168
PCT Pub. Date: Jul. 15, 2021

(65) Prior Publication Data
US 2022/0151228 A1 May 19, 2022

(30) Foreign Application Priority Data
Jan. 10, 2020 (CN) .......................... 202010025079.9

(51) Int. Cl.
*A01N 35/02* (2006.01)
*C02F 1/50* (2006.01)
*C02F 103/00* (2006.01)

(52) U.S. Cl.
CPC ................ *A01N 35/02* (2013.01); *C02F 1/50* (2013.01); *C02F 2103/007* (2013.01); *C02F 2303/20* (2013.01)

(58) Field of Classification Search
None
See application file for complete search history.

(56) References Cited

U.S. PATENT DOCUMENTS

| | | | | |
|---|---|---|---|---|
| 6,069,113 A | * | 5/2000 | Kierzkowski | A01N 59/20 504/152 |
| 2014/0170170 A1 | * | 6/2014 | Qiu | C07K 16/14 424/175.1 |

FOREIGN PATENT DOCUMENTS

| CN | 200780019880 | 9/2012 |
|---|---|---|
| CN | 201611012600 | 3/2017 |
| CN | 201711282870 | 6/2018 |

OTHER PUBLICATIONS ("Analysis of the characteristics and causes of water quality changes in the Wuxi water area of Taihu Lake", Yangtze River, 2019, 50, 40-44.

(Continued)

*Primary Examiner* — Richard C Gurtowski
(74) *Attorney, Agent, or Firm* — Treasure IP Group, LLC (57) ABSTRACT

Disclosed is application of acetylacetone in inhibiting the growth of cyanobacteria, that is, acetylacetone is added in water disturbed with cyanobacteria, and the dosage of acetylacetone is not less than 7 mg/L to inhibit the growth of cyanobacteria. Acetylacetone inhibits the growth of cyanobacteria by inhibiting photosynthesis, has a better algicidal effect than common algaecides, is harmless to common bacteria such as *Escherichia coli, Salmonella, Bacillus subtilis,* and *Staphylococcus aureus,* and is environmentally friendly and easy to popularize and apply.

3 Claims, 4 Drawing Sheets

(56) References Cited

OTHER PUBLICATIONS http://algae.ihb.ac.cn/Products/ProductDetail.aspx?product=523.
"The effect of light on the growth and chlorophyll fluorescence of Chlorella and Microcystis aeruginosa", Journal of Xi'an University of Arts and Science, 2019, 22, 73-77.
"Effects of different algaecides on the photosynthetic capacity, cell integrity and microcystin-LR release of Microcystis aeruginosa", Sci. Total Environ. 2013, 463, 111-119.
"Potent removal of cyanobacteria with controlled release of toxic secondary metabolites by a titanium xerogel coagulant". Water Res. 2018, 128, 341-349.
Toxic and non-toxic strains of Microcystis aeruginosa induce temperature dependent allelopathy toward growth and photosynthesis of Chlorella vulgaris, Harmful Algae 2015, 48, 21-29.
"Outbreak, Harm and Control of Lake Cyanobacteria Blooms", 2011, Yang Liuyan, Xiao Lin, Science Press, pp. 10-12.
Handbook of chemical property estimation methods. 1990, pp. 15-1 to 15-29.
Handbook of chemical property estimation methods. 1990, pp. 7-4, 7-5, 8-12.
"Research Advances on Allelopathy and Its Effects on the Photosynthesis of Algae", Environmental Science and Technology, 2019, 42(4), 43-52.
"Study on the antibacterial properties of multi-walled carbon nanotubes modified by pyrogallic acid", 2013 Annual Conference Paper Abstract, Tianjin Biomedical Engineering Society.
"Research progress on pharmacological effects of gallic acid", Chinese Journal of Hospital Pharmacy, 2017, 37, 94-98.
"Advances in Studies on Antibacterial Activity and Mechanism of Anthraquinone Compounds", Chinese Journal New Drugs, 2016, 25, 2450-2455.
"In vitro antibacterial effect of sanguinarine and its effect on bacterial biofilm", Chinese Journal of Animal Science, 2012, 48, 67-70.
Exploring QSAR. Hydrophobic, Electronic, and Steric Constants. 1995, p. 14. J. Med. Chem. 1996, 39, 1189-1191.
"Fate and implication of acetylacetone in photochemical processes for water treatment", Water Res. 2016, 101, 233-240.
"Feasibility of the UV/AA process as a pretreatment approach for bioremediation of dye-laden wastewater", Chemosphere 2018, 194, 488-494.
Mihebai Yilimulati et al., Regulation of Photosynthesis in Bloom-forming Cyanobacteria with the Simplest β-diketone. Environ. Sci. Technol., 2021, 55, 14173-14184.

\* cited by examiner

APPLICATION OF ACETYLACETONE IN INHIBITING GROWTH OF CYANOBACTERIA

CROSS REFERENCE TO RELATED APPLICATION

This application claims priority to a PCT PCT/CN2020/111195, filed on Aug. 26, 2020, which in turn takes priority of Chinese Application No. 202010025079.9, filed on Jan. 10, 2020. Both the PCT application and Chinese Application are incorporated herein by reference in their entireties.

TECHNICAL FIELD

The disclosure relates to the field of algaecides, and in particular relates to application of acetylacetone in inhibiting the growth of cyanobacteria in eutrophic water.

BACKGROUND ART

In recent years, the outbreak of cyanobacterial blooms caused by eutrophication has seriously affected people's lives. Cyanobacterial blooms not only cause death of aquatic organisms and change the aquatic ecological environment, but also directly affect the water supply safety for human beings. *Microcystis aeruginosa*, as the typical bloom forming cyanobacteria, are generally divided into toxin-producing strains (such as FACHB-905) and non-toxin-producing strains (such as FACHB-469). The toxin-producing strains release microcystin which is toxic to the liver. *Microcystis aeruginosa* has strong viability and is the most common type of toxic cyanobacteria. Therefore, it is of great significance to effectively control the growth of *Microcystis aeruginosa* in water.

The commonly used methods for bloom control can be divided into physical approaches and chemical approaches. Collecting cyanobacteria through a mechanical way (such as salvage) is typically used physical approach, which is high in cost and difficult to implement in a large body of water. The most commonly used chemical method is to add algaecides into water. At present, the most promising algaecides are allelochemicals that are released from natural organisms. For example, substances such as phenolic acids and fatty acids secreted by *Myriophyllum spicatum* and N-phenyl-2-naphthylamine secreted by *Hydrilla verticillata* can control the growth of *Microcystis aeruginosa* ("Research Advances on Allelopathy and Its Effects on the Photosynthesis of Algae", *Environmental Science and Technology*, 2019, 42(4), 43-52). Although some allelochemicals can achieve good algicidal effects, the availability of allelochemicals is generally poor. The purification and collection of allelochemicals are limited by their low contents in natural matter. As a result, the application of allelopathic algaecides is greatly restricted.

Anthraquinone, gallic acid, pyrogallic acid and sanguinarine are common algaecides at present. These algaecides have antibacterial properties ("Study on the antibacterial properties of multi-walled carbon nanotubes modified by pyrogallic acid", 2013 *Annual Conference Paper Abstract, Tianjin Biomedical Engineering Society;* "Research progress on pharmacological effects of gallic acid", *Chinese Journal of Hospital Pharmacy*, 2017, 37, 94-98; "Advances in Studies on Antibacterial Activity and Mechanism of Anthraquinone Compounds", *Chinese Journal New Drugs*, 2016, 25, 2450-2455; and "In vitro antibacterial effect of sanguinarine and its effect on bacterial biofilm", *Chinese Journal of Animal Science*, 2012, 48, 67-70), and might affect other organisms when inhibiting the growth of cyanobacteria.

Acetylacetone is a small-molecular diketone with a standard name as 2,4-pentanedione. As an important chemical and pharmaceutical intermediate, acetylacetone is mainly used in the pharmaceutical industry, as well as the in medicine, feed additives, catalysts, co-catalyst, and inorganic materials. Patent CN 106519756 B discloses a bactericidal and anti-fungal interior wall nano paint, of which one of the raw materials is acetylacetone. Patent CN 101454267 B discloses a method for preparing curcumin with vanillin and acetylacetone as raw materials. Patent CN 108217868 A discloses a method for preparation of a compound algaecide, in which acetylacetone is used as a hydrolysis inhibitor for the preparation of nano titanium dioxide that is served as the matrix component of an algaecide. The compound algaecide encapsulates allelochemicals and copper sulfate into the matrix component, and controls the growth of cyanobacteria through the combined effects of flocculation, generation of free radicals by photocatalysis of titanium dioxide, and the encapsulated algicidal substances. The volatilization half-lives of the acetylacetone in a model river and a model lake are 16 days and 120 days according to the Henry's law constant of acetylacetone ($2.35\times10^{-6}$ atm m$^3$/mol at 25° C.), respectively (Handbook of chemical property estimation methods. 1990, pp. 15-1 to 15-29). It is determined through experiments that the aquatic oxidation rate of acetylacetone at pH 6.4 is $9.9\times10^{-9}$ L mol$^{-1}$ s$^{-1}$. Based on the aquatic oxidation rate and the concentration ($1\times10^{-17}$ M) of hydroxyl radicals in water under continuous sunlight, it is estimated that the oxidation half-life of acetylacetone in water is 81 days (Handbook of chemical property estimation methods. 1990, pp. 7-4, 7-5, 8-12). The bioconcentration factor (BCF) of acetylacetone is 3, indicating that its bioconcentration potential is very low (*Exploring QSAR. Hydrophobic, Electronic, and Steric Constants*. 1995, p. 14). Studies have shown that 50 mg/L acetylacetone and its photolysis products are bio-friendly to activated sludge ("Fate and implication of acetylacetone in photochemical processes for water treatment", *Water Res.* 2016, 101, 233-240). The median lethal dose of acetylacetone to *Daphnia magna* is higher than 50 mg/L ("Feasibility of the UV/AA process as a pretreatment approach for bioremediation of dye-laden wastewater", *Chemosphere* 2018, 194, 488-494). The above data show that the application of acetylacetone in natural water will not cause adverse environmental impacts. Although acetylacetone is widely used as a raw material for the synthesis of pesticides and fungicides, there have been no reports of its use as an algaecide so far.

SUMMARY OF THE INVENTION

In view of the problem of lacking an economical and effective method for controlling cyanobacterial blooms, the disclosure provides application of acetylacetone in inhibiting the growth of cyanobacteria and a method for inhibiting the growth of cyanobacteria. Specifically, the above-mentioned objective of the disclosure is achieved through the following technical solution:

First, an example of the disclosure provides application of acetylacetone in inhibiting the growth of cyanobacteria. The cyanobacteria include the toxin-producing strain FACHB-905 and the non-toxin-producing strain FACHB-469 of *Microcystis aeruginosa*.

Secondly, an example of the disclosure provides an algaecide containing acetylacetone. In specific applications, the algaecide may also include other common additives or fillers. The additives refer to auxiliary substances used to improve the physical and chemical properties of the algaecide, such as solvents, dispersants, adhesives, stabilizers, and slow-release materials.

Third, an example of the disclosure further provides a method for inhibiting the growth of cyanobacteria, including the following specific step: adding acetylacetone to water to inhibit the growth of the cyanobacteria. The dosage of acetylacetone is not less than 7 mg/L, and the density of cyanobacteria in the water is less than $2.59 \times 10^7$ cells/mL.

The chemical formula of acetylacetone is $CH_3COCH_2COCH_3$, and the structural formula is:

In the present application, the technical term "cyanobacteria" includes *Microcystis aeruginosa*, *Microcystis flos-aquae*, *Microcystis wesenbergii*, *Microcystis marginata*, *Microcystis incerta* and so on ("Outbreak, Harm and Control of Lake Cyanobacteria Blooms", 2011, Yang Liuyan, Xiao Lin, Science Press, pp. 10-12.).

The above-mentioned *Microcystis aeruginosa* includes toxin-producing strain FACHB-905 and non-toxin-producing strain FACHB-469. The applicable density range of *Microcystis aeruginosa* is less than $2.59 \times 10^7$ cells/mL, and the relationship between optical density and concentration of *Microcystis aeruginosa* is as follows:

$$Y = 25.561X + 0.3268$$

wherein Y is the cell density of *Microcystis aeruginosa* (unit: $10^6$ cells/mL), and X is the optical density value $OD_{680}$ of algae culture.

An example of the disclosure provides an algaecide containing acetylacetone. Compared with common algaecides (anthraquinone, lysine, ethyl 2-methylacetoacetate, gallic acid, pyrogallic acid and sanguinarine), the algicidal effect of the acetylacetone-containing algaecide on *Microcystis aeruginosa* is better than that of other algaecides.

An example of the disclosure selects four common bacteria (*Escherichia coli*, *Salmonella*, *Bacillus subtilis* and *Staphylococcus aureus*), and finds that acetylacetone of 6-768 mg/L has no inhibitory effect on the above-mentioned bacteria, which indicates that acetylacetone is environmentally friendly.

The working mechanism of the method for inhibiting cyanobacteria provided by the disclosure is that acetylacetone causes cell death by inhibiting photosynthesis of *Microcystis aeruginosa*.

Compared with the existing physical and chemical methods for inhibiting cyanobacteria, the disclosure is more economical and effective. Acetylacetone not only has a good algicidal effect, but is also friendly to activated sludge, *Daphnia magna* and some common bacteria within the concentration range of growth inhibiting of cyanobacteria. Using acetylacetone as an algaecide is a low-cost and environment-friendly method for controlling cyanobacterial blooms.

DETAILED DESCRIPTION OF THE INVENTION

The disclosure will be described in detail below in conjunction with examples.

(1) Reagents Involved in the Examples

In the examples, the acetylacetone (hereinafter referred to as AA, purchased from Nanjing Chemical Reagent Co., Ltd.) and pyrogallic acid (purchased from Aladdin) are analytically pure; the purity of anthraquinone (purchased from Alfa Aesar), L-lysine (purchased from Aladdin) and sanguinarine (purchased from Macklin) is 98%; the purity of gallic acid (purchased from Sinopharm) is 99%; and ethyl 2-methylacetoacetate (purchased from Aladdin) is chemically pure.

The cyanobacteria used in the present disclosure are the high-toxin-producing strain (FACHB-905) and the non-toxin-producing strain (FACHB-469) of *Microcystis aeruginosa* (see "Toxic and non-toxic strains of *Microcystis aeruginosa* induce temperature dependent allelopathy toward growth and photosynthesis of *Chlorella vulgaris*", *Harmful Algae* 2015, 48, 21-29), provided by the Institute of Hydrobiology, Chinese Academy of Sciences, and cultured in BG-11 medium.

The components of the BG-11 medium include: $NaNO_3$ 1.5 g/L, $K_2HPO_4 \cdot 3H_2O$ 0.04 g/L, $MgSO_4 \cdot 7H_2O$ 0.075 g/L, $CaCl_2 \cdot 2H_2O$ 0.036 g/L, citric acid 0.006 g/L, ammonium ferric citrate 0.006 g/L, $Na_2EDTA$ 0.001 g/L, $NaCO_3$ 0.02 g/L, and A5 solution 0.1 mL. The formula of the A5 solution is: $H_3BO_3$ 2.86 g/L, $MnCl_2 \cdot 4H_2O$ 1.86 g/L, $ZnSO_4 \cdot 7H_2O$ 0.22 g/L, $Na_2MoO_4 \cdot 2H_2O$ 0.39 g/L, $CuSO_4 \cdot 5H_2O$ 0.08 g/L, and $Co(NO_3)_2 \cdot 6H_2O$ 0.05 g/L.

Unless otherwise specified, the *Microcystis aeruginosa* species used in the following examples is the high-toxin-producing strain FACHB-905.

The bacteria used in the following examples are *Escherichia coli*, *Salmonella*, *Bacillus subtilis* and *Staphylococcus aureus*, all of which are provided by the School of Life Sciences, Nanjing University. The bacteria are cultured with an LB nutrient broth. The main components of the LB nutrient broth include: tryptone 10.0 g/L, yeast extract 5.0 g/L, and sodium chloride 10.0 g/L.

(2) Reaction Devices

*Microcystis aeruginosa* is cultured in a light incubator (GZX-250BS-III), provided by Shanghai CIMO Medical Instrument Co., Ltd., with a light intensity of 3000 LX, a light-dark time ratio of 12:12, and a temperature setting of 25° C. The four kinds of bacteria are all cultured in a biochemical incubator (SPX-150), provided by Shanghai Yuejin Medical Instruments Co., Ltd., with a temperature setting of 37° C.

(3) Detection Method

The concentration of *Microcystis aeruginosa* and other bacteria is measured with an ultraviolet spectrophotometer (Shimadzu, UV-2700), and the concentration is characterized by the optical density of liquid at 680 nm and 600 nm, and recorded as $OD_{680}$ and $OD_{600}$, respectively.

The measurement of chlorophyll a refers to the method in the literature ("Potent removal of cyanobacteria with controlled release of toxic secondary metabolites by a titanium xerogel coagulant", *Water Res.* 2018, 128, 341-349). Specifically, collected algae culture is filtered with a 0.7 μm GF/F glass filter membrane (Whatman). The collected cells are frozen overnight in a refrigerator at −4° C. Then 90% acetone is added for overnight extraction. The extract is centrifuged in a high-speed refrigerated centrifuge (Tianuoda, CT14RD) at 10,000 rpm and 4° C. for 10 min to collect the supernatant, and the absorbance is detected at 630 nm, 663 nm, 645 nm and 750 nm. The formula for calculating the content of chlorophyll a is as follows:

$$Chl-a(\mu g/ml) = \frac{\left(\frac{11.64(A_{663} - A_{750}) - 2.16(A_{645} - A_{750}) -}{0.10(A_{630} - A_{750})}\right) \times V_e}{V_s \times \delta}$$

wherein A663, A750, A645 and A750 are the absorbance of the supernatant at 663 nm, 750 nm, 645 nm and 750 nm, respectively. $V_e$ is the volume of an extracted solution, $V_s$ is the volume of a filtered solution, and $\delta$ is the optical path of a cuvette. The calculation formula for the inhibition rate of an algaecide on *Microcystis aeruginosa* is as follows:

$$\text{Inhibition rate} = \frac{[Chl-a]_C - [Chl-a]}{[Chl-a]_C}$$

wherein $[Chl-a]_C$ is the content of chlorophyll a in a control group (Control), and [Chl-a] is the content of chlorophyll a in an experimental group added with algaecide.

The actual photochemical quantum yield is measured using a Water-PAM phytoplankton analyzer (Walz), and 2.5 mL of algae culture is taken to measure $F_m'$ and $F_s$ after light adaptation. The calculation formula for the actual photochemical quantum yield is as follows:

$$\phi_e = \Delta F/F_m' = (F_m' - F_s)/F_m'$$

wherein $\phi_e$ is the actual photochemical quantum yield, and $F_m'$ and $F_s$ are the maximum chlorophyll fluorescence and the stable chlorophyll fluorescence of the algae culture after light adaptation, respectively ("Effects of different algaecides on the photosynthetic capacity, cell integrity and microcystin-LR release of *Microcystis aeruginosa*", *Sci. Total Environ.* 2013, 463, 111-119).

EXAMPLE 1

(1) Algicidal Effect of Acetylacetone on High-Toxin-Producing Strain FACHB-905 of *Microcystis aeruginosa*

100 mL of BG-11 medium was added to a 150 mL Erlenmeyer flasks, and was inoculated with cyanobacteria of 0.2 calculated as $OD_{680}$ under aseptic conditions. Different volumes of the AA stock solution were added to the Erlenmeyer flasks to make sure that the dosage of AA was 5 mg/L, 7 mg/L, 10 mg/L, 15 mg/L and 20 mg/L in different Erlenmeyer flasks. At the same time, a control experiment (Control) without AA was established. The cyanobacteria were put in a light incubator for culture. Considering the existing reports that the most suitable growth light for cyanobacteria was 2,000-4,000 LX (see "Freshwater Algae Culture Collection at the Institute of Hydrobiology", website "http://algae.ihb.ac.cn/Products/ProductDetail.aspx?product=523", and the literature "The effect of light on the growth and chlorophyll fluorescence of *Chlorella* and *Microcystis aeruginosa*", *Journal of Xi'an University of Arts and Science*, 2019, 22, 73-77"), 3,000 LX was selected as the light intensity in the present example. At the beginning of the incubation and after 0.5 d, 1 d, 1.5 d, 2 d, 3 d, 4 d and 5 d of the incubation, samples were taken to detect the $OD_{680}$ under aseptic conditions.

Figure 1:
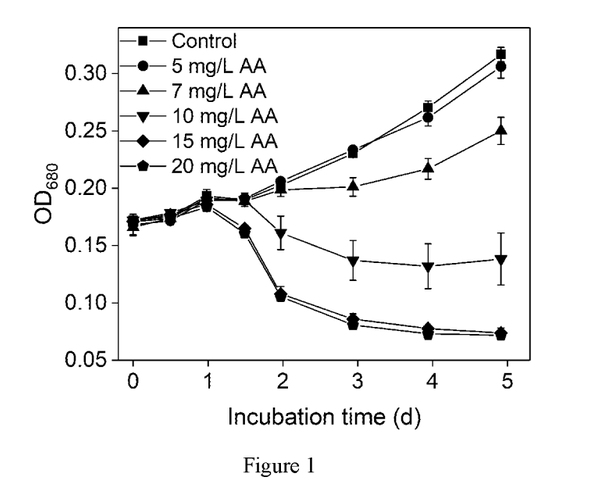
FIG. 1 is a schematic diagram of the optical density evolution of algae culture during the incubation of *Microcystis aeruginosa* (FACHB-905) with AA in an example.

FIG. 1 shows the optical density evolution of the high-toxin-producing strain *Microcystis aeruginosa* within 5 days. It can be seen from the figure that AA had no significant effect on the growth of *Microcystis aeruginosa* on the first day of addition. Starting from day 1.5, the optical density of *Microcystis aeruginosa* with an AA concentration greater than 15 mg/L began to decrease, and the *Microcystis aeruginosa* continued to die in the continued incubation process. When the AA concentration was 20 mg/L, there was no significant change in the growth curve of *Microcystis aeruginosa* compared with that adding 15 mg/L AA. The algicidal effect of 10 mg/L AA on *Microcystis aeruginosa* was weaker than that of 15 mg/L AA, but 10 mg/L AA continued to show algicidal effect on the growth of *Microcystis aeruginosa* within the range of incubation time. When the AA concentration was 7 mg/L, the growth of *Microcystis aeruginosa* was inhibited, but the growth curve of which is still increase. 5 mg/L AA had no significant effect on the growth of the *Microcystis aeruginosa* compared to the control group.

(2) Algicidal Effect of Acetylacetone on the Non-Toxic Strain FACHB-469 of *Microcystis aeruginosa*

Except for the different cyanobacteria strain, other operations are the same as those in step (1).

Figure 2:
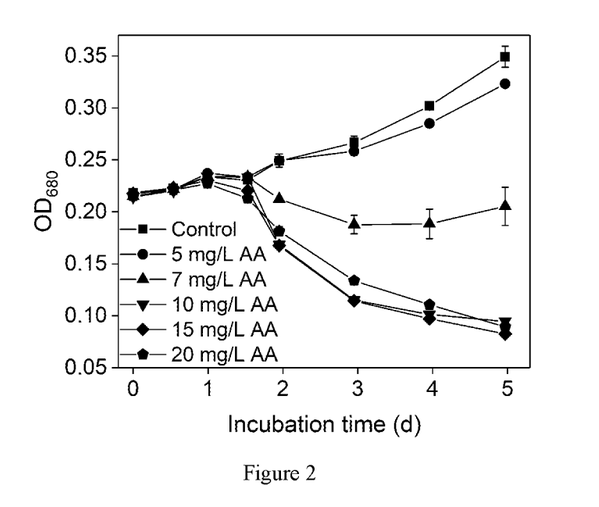
FIG. 2 is a schematic diagram of the optical density evolution of algae culture during the incubation of *Microcystis aeruginosa* (FACHB-469) with AA in an example.

FIG. 2 shows the optical density evolution of the non-toxic strain *Microcystis aeruginosa* within 5 days. It can be seen from the figure that, similar to the response of the toxic strain to AA, the non-toxic strain growth was also inhibited by AA on day 1.5. The higher the AA concentration, the more significant the algicidal effect on *Microcystis aeruginosa* growth. When the dosage of AA was greater than 10 mg/L, the growth of *Microcystis aeruginosa* was significantly inhibited, and *Microcystis aeruginosa* continued to die in the subsequent incubation process. When the concentration of AA increased to 20 mg/L, the growth curve of *Microcystis aeruginosa* did not change significantly compared with that with 10 mg/L AA and 15 mg/L AA. When AA concentration was 7 mg/L, the algicidal effect on the growth of the *Microcystis aeruginosa* was significantly weakened, but unlike the effect of AA on the toxin-producing strain, 7 mg/L AA had a certain algicidal effect on *Microcystis aeruginosa*. 5 mg/L AA still showed algicidal effect on the non-toxic strain. It can thus be seen that the tolerance of the non-toxic strain FACHB-469 to AA was worse than that of the toxic strain FACHB-905, and the same concentration of AA had a more significant algicidal effect on the non-toxic strain.

EXAMPLE 2

100 mL of BG-11 medium was added to 150 mL Erlenmeyer flasks, and was inoculated with cyanobacteria to finally obtain solutions with the $OD_{680}$ of 0.11, 0.27, 0.62 and 1.0, respectively, under aseptic conditions. A certain volume of the AA stock solution was added to the Erlenmeyer flasks, so that the dosage of AA is 15 mg/L. At the same time, the control experiments (Control) without AA were established for different cyanobacteria densities. The cyanobacteria were put in a light incubator for culture. At the beginning of the incubation and after 1 d, 2 d, 3 d, 4 d, and 5 d of the incubation, samples were taken to detect the $OD_{680}$ under aseptic conditions.

Figure 3:
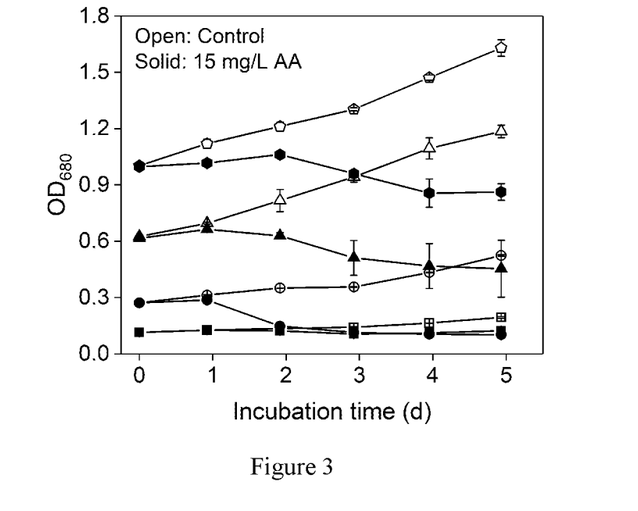
FIG. 3 is a schematic diagram of the optical density evolution of algae culture of different initial densities of *Microcystis aeruginosa* under the action of AA of 15 mg/L.

FIG. 3 shows the optical density evolution of *Microcystis aeruginosa* with different initial density under the action of AA with 15 mg/L in 5 d. It can be seen from the figure that when $OD_{680}$ of *Microcystis aeruginosa* changed from 0.11 to 1.0, AA exhibited excellent algicidal performance on *Microcystis aeruginosa*, indicating that the effect of AA on high-density cyanobacteria ($2.59 \times 10^7$ cells/mL) was still significant.

Taihu Lake is a water with serious eutrophication in China. From 2011 to 2017, the annual average value of algae density in the Wuxi water area of Taihu Lake was lower than $1.7 \times 10^7$ cells/mL ("Analysis of the characteristics and causes of water quality changes in the Wuxi water area of Taihu Lake", *Yangtze River*, 2019, 50, 40-44). The experiments in the present example shows that AA is expected to be applied to cyanobacteria blooms in actual waters.

EXAMPLE 3

300 mL of BG-11 medium was added to 500 mL Erlenmeyer flasks, and was inoculated with cyanobacteria of 0.2 calculated as $OD_{680}$ under aseptic conditions. Concentrated stock solutions of AA, anthraquinone, lysine, ethyl 2-methylacetoacetate, gallic acid, pyrogallic acid and sanguinarine were added to the Erlenmeyer flasks, so that the dosages of the pyrogallic acid and the sanguinarine were 5 mg/L and 0.5 mg/L, respectively, and the dosages of the other algaecides were all 15 mg/L. At the same time, a control experiment (Control) without algaecides was established. The cyanobacteria were put in a light incubator for culture. Samples were taken to detect the content of chlorophyll a under aseptic conditions at the beginning of the incubation and after 1 d, 2 d, and 3 d of incubation, and the evolution of the chlorophyll a content were used to evaluate the algicidal performance of various algaecides.

Figure 4:
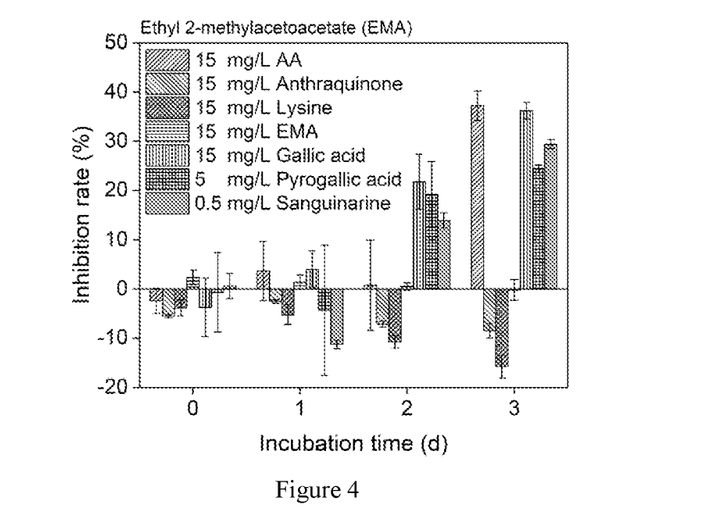
FIG. 4 is a schematic diagram of comparison in algicidal effect between AA and other common algaecides in an example.

FIG. 4 shows the comparison of the inhibition rate of various algaecides on *Microcystis aeruginosa*. It can be seen from FIG. 4 that although some of the algaecides showed significant algicidal effects on the second day, the inhibition rate of AA on *Microcystis aeruginosa* was higher than all other algaecides when *Microcystis aeruginosa* incubated with algaecides for 3 days. Among the algaecides tested in the experiment, only the inhibition rate of gallic acid was close to that of AA. It should be pointed out that pyrogallic acid and sanguinarine are not suitable to be applied in environmental waters due to the changing of water color and solubility of the algaecide, respectively.

EXAMPLE 4

4 mL of nutrient broth was added to 9 test tubes under aseptic conditions, and the test tubes were numbered 1 to 9. A broth stock solution containing 1,536 mg/L AA was prepared, and 4 mL of which was taken and added to the No. 9 test tube. After the solution in the No. 9 test tube was uniformly mixed, 4 mL of the mixed solution in the No. 9 test tube was taken and added to the No. 8 test tube. By analogy, dilution was performed by the stepwise dilution method to the No. 2 test tube, and after uniform mixing, 4 mL of the solution in the No. 2 test tube was taken and discarded. The No. 1 test tube without AA was taken as the blank group (Control). The final concentrations of AA in each test tube from No. 1 to No. 9 were 0 mg/L, 6 mg/L, 12 mg/L, 24 mg/L, 48 mg/L, 96 mg/L, 192 mg/L, 384 mg/L, and 768 mg/L, respectively. A suspension of the bacteria was diluted with nutrient broth to an $OD_{600}$ of 0.05. 100 μL of the diluted suspension was added to each of the 9 test tubes, and the test tubes were sealed with sterilized sealing films. After completing the above operations, the bacterial solutions were put into a biochemical incubator, and the $OD_{600}$ in each test tube was measured after incubation for 24 h.

Figure 5:
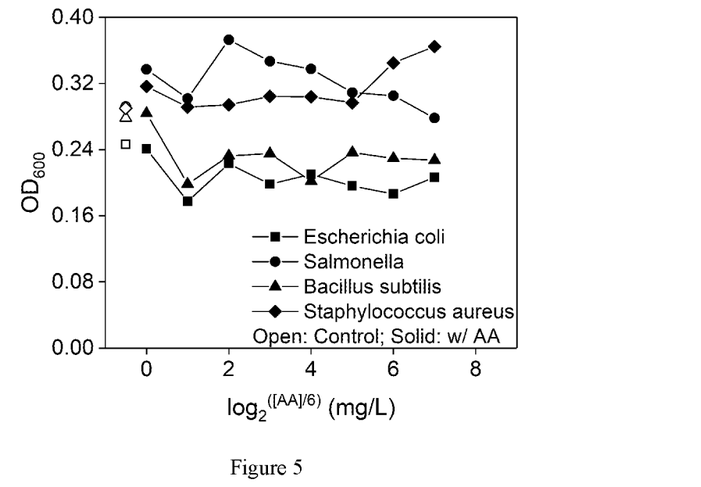
FIG. 5 is a schematic diagram of the evolution of the bacterial optical density during the incubation of different types of bacteria with AA in an example.

FIG. 5 shows the optical density evolution at 600 nm of *Escherichia coli*, *Salmonella*, *Bacillus subtilis*, and *Staphylococcus aureus* incubated with AA of different concentrations after 24 h. It can be seen from the figure that all the four bacteria could grow when the AA concentration was in the range of 6-768 mg/L, and AA basically had no influence on the growth of the four bacteria as compared with the control group. The growth rate of *Escherichia coli* with 12 mg/L AA was slightly lower than that of the control group, but when the AA concentration was increased to 24 mg/L, the growth rate of *Escherichia coli* increased slightly. Compared with the control group, the growth rate of *Salmonella* increased under the action of 6-384 mg/L AA. It may be that AA act as a carbon source to promote the growth of *Salmonella*. Although the growth rate of *Salmonella* decreased when AA concentration was 768 mg/L, the bacteria still showed a growth trend within 24 h. The influence of AA on *Bacillus subtilis* growth is similar to that of *Escherichia coli*. AA with a concentration of up to 768 mg/L can still promote the growth of *Staphylococcus aureus*. Considering the tolerance of the above-mentioned four bacteria to AA, it can be seen that AA will not kill these bacteria when the concentration is less than 738 mg/L, and AA can promote the growth of some bacteria. The above examples show that AA has no toxic effect on bacteria that do not contain photosystem, and it is further speculated that AA, as an algaecide, is friendly to zooplankton in water.

EXAMPLE 5

100 mL of BG-11 medium was added to 150 mL Erlenmeyer flasks, and was inoculated with cyanobacteria to an initial $OD_{680}$ of 0.2 under aseptic conditions. Different volumes of the AA stock solution were added to the Erlenmeyer flasks, so that the dosage of AA was 7 mg/L, 10 mg/L and 15 mg/L, respectively. At the same time, a control experiment (Control) without AA was established. The cyanobacteria were put in a light incubator for culture. At the beginning of the incubation and after 0.5 d, 1 d, 1.5 d, 2 d, 3 d, 4 d, and 5 d of the incubation, samples were taken to detect the chlorophyll fluorescence parameters under aseptic conditions.

Figure 6:
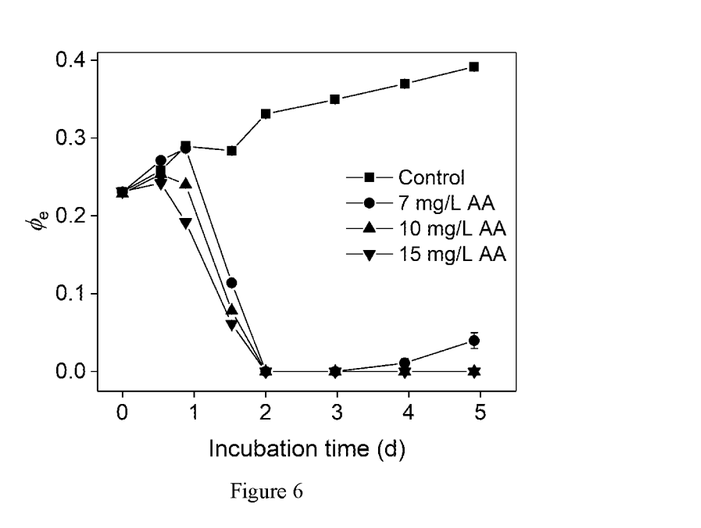
FIG. 6 is a schematic diagram of the change in the actual photochemical quantum yield of the photosystem during the incubation of *Microcystis aeruginosa* with AA in an example.

FIG. 6 shows the evolution of actual photochemical quantum yield of *Microcystis aeruginosa* incubated with AA. It can be seen from the figure that the actual photochemical quantum yield of *Microcystis aeruginosa* was significantly inhibited by AA after 1 day of incubation, and the inhibitory effect became more significant as the concentration of AA increased. In the continued incubation process, the actual photochemical quantum yield of *Microcystis aeruginosa* continued to decrease. By the second day of growth, the actual photochemical quantum yield of *Microcystis aeruginosa* with AA of greater than 7 mg/L was 0. It can be seen from Example 1 that the growth of *Microcystis aeruginosa* was inhibited by AA on day 1.5, while the actual photochemical quantum yield of *Microcystis aeruginosa* was inhibited on day 1, indicating that AA acted on the photosystem of the cyanobacteria. That is, AA led to a significant decrease of the actual photochemical quantum yield of cyanobacteria, and subsequently caused the death of the cyanobacteria.

EXAMPLE 6

100 mL of BG-11 medium was added to 150 mL Erlenmeyer flasks, and was inoculated with cyanobacteria to an initial $OD_{680}$ of 0.2 under aseptic conditions. A certain volume of the AA stock solution was added to the Erlenmeyer flasks, so that the dosage of AA was 10 mg/L or 20 mg/L. At the same time, a control experiment (Control) without AA was established. The cyanobacteria were placed at a sunlit window sill for incubation. At the beginning of the incubation and after 0.5 d, 1 d, 1.5 d, 2 d, 3 d, 4 d, and 5 d of the incubation, samples were taken to detect the $OD_{680}$ under aseptic conditions.

Figure 7:
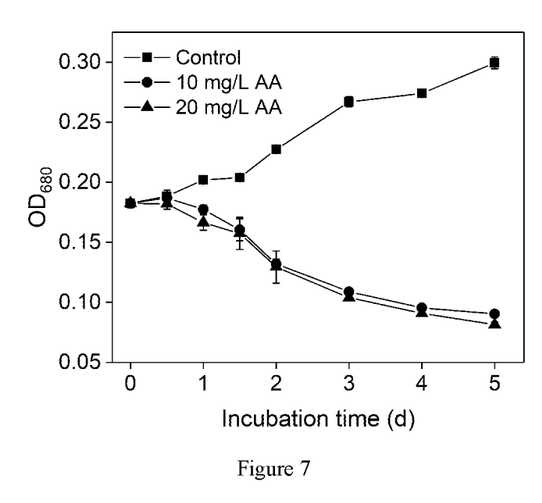
FIG. 7 is a schematic diagram of the optical density evolution of algae culture when AA inhibited the growth of *Microcystis aeruginosa* under natural light conditions.

FIG. 7 shows the optical density evolution of *Microcystis aeruginosa* incubated with AA under sunlight within 5 days.

It can be seen from FIG. 7 that *Microcystis aeruginosa* of the control group grew well under sunlight, while the growth of *Microcystis aeruginosa* incubated with 10 mg/L AA and 20 mg/L AA was significantly inhibited, indicating that AA can still effectively inhibit the growth of *Microcystis aeruginosa* under sunlight, and can be used as an algaecide applied to water areas where cyanobacteria grow.

The invention claimed is:

1. A method of controlling cyanobacterial blooms in a water for treatment, comprising
    inhibiting growth of cyanobacteria in the water for treatment,
    by administration of an effective amount of an algaecide containing acetylacetone,
    wherein the acetylacetone inhibits photosynthesis of cyanobacteria.

2. The method of claim 1, wherein the cyanobacteria comprises *Microcystis aeruginosa*.

3. The method of claim 1, wherein the effective amount of acetylacetone in the water for treatment is not less than 7 mg/L.

* * * * *